United States Patent [19]

Bobard

[11] 4,174,012

[45] Nov. 13, 1979

[54] SELF-PROPELLED UNIT WITH A HIGH-CLEARANCE CHASSIS VEHICLE

[75] Inventor: Emile Bobard, Beaune, France

[73] Assignee: Emile Bobard and Jeune Bobard (S.A.), Beaune, France

[21] Appl. No.: 876,088

[22] Filed: Feb. 8, 1978

[30] Foreign Application Priority Data

Feb. 11, 1977 [FR] France .................................. 77 04044

[51] Int. Cl.² .............................................. B60P 1/02
[52] U.S. Cl. ..................................... 180/313; 172/273; 280/760
[58] Field of Search .................... 180/1 F; 214/394; 172/272, 273; 280/6 H, 32.5, 43.23, 477, 760

[56] References Cited

U.S. PATENT DOCUMENTS

| 3,874,469 | 4/1975 | Sjovall | 172/273 X |
| 3,892,322 | 7/1975 | Drennhaus | 172/273 X |
| 4,034,998 | 7/1977 | Iijima et al. | 172/272 X |

FOREIGN PATENT DOCUMENTS

563701 7/1975 Switzerland .

Primary Examiner—Joseph F. Peters, Jr.
Assistant Examiner—Michael Mar
Attorney, Agent, or Firm—Pollock, Vande Sande & Priddy

[57] ABSTRACT

A self-propelled unit comprises a work facilitating implement coupled to a high-clearance chassis vehicle, the implement being provided with a support for supporting it on longitudinally and horizontally extending flanges fixed on the chassis. The vehicle is relatively movable between the support of the vehicle and the implement to allow disengagement of the latter from the vehicle by longitudinal movement of the vehicle relative to the implement when the latter is supported on the ground, the relative movement being effected independently of the implement support and providing for support of the chassis on the ground.

9 Claims, 9 Drawing Figures

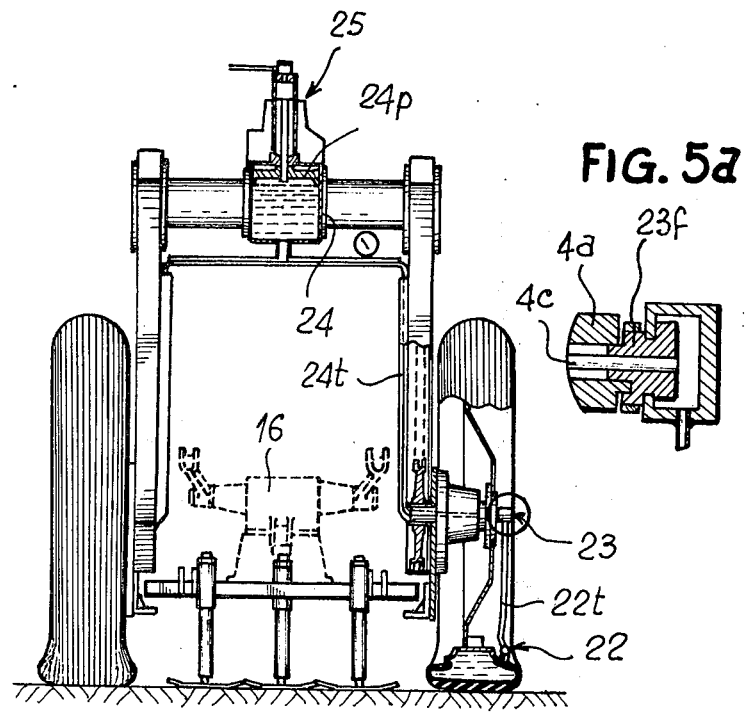
FIG.5
FIG.5a
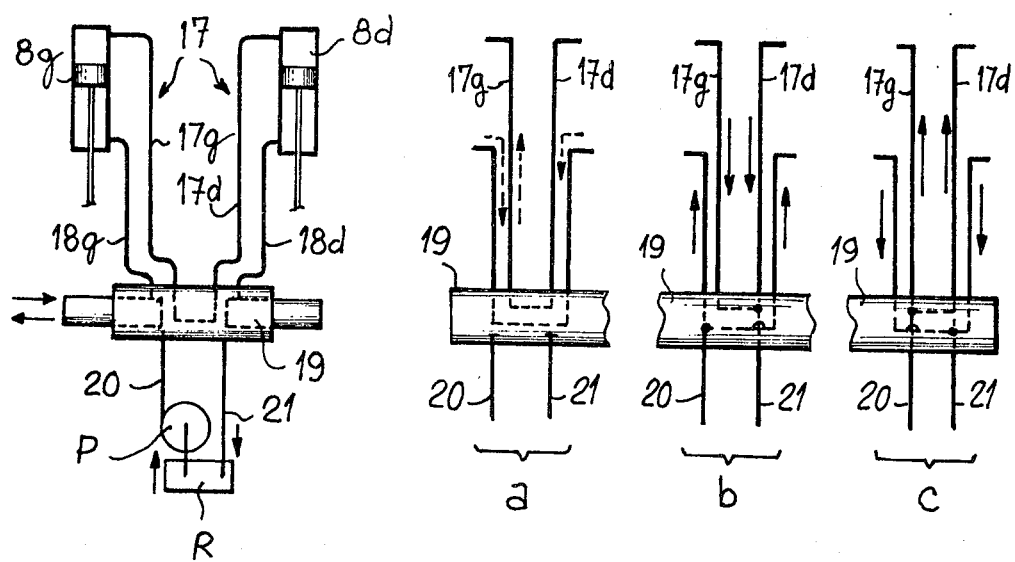
FIG.6   FIG.6a   FIG.6b   FIG.6c

SELF-PROPELLED UNIT WITH A HIGH-CLEARANCE CHASSIS VEHICLE

The invention relates to a self-propelled unit comprising a work-facilitating device coupled to a self-propelled high-clearance chassis vehicle and suitable for use with traditional cultivation implements or tools, e.g., for tilling operations.

Self-propelled vehicles with a high-clearance chassis are already known to which various implements can be coupled to produce either self-propelled harvesting machines or self-propelled cultivation units, depending upon the nature of the coupled implement.

For example U.S. Pat. No. 3,953,050 proposes a high-clearance tractor, each chassis flank of which is provided with a vertically displaceable longitudinal member and with supports for coupling to a working implement placed on the ground after the tractor has been moved so as to straddle the implement.

It is an object of the invention to provide a self-propelled unit of the composite type formed by coupling a work-facilitating device to a vehicle with a high clearance chassis such as a high-clearance tractor, the unit being suitable for use with tools or machines intended for use with conventional tractors.

According to the invention there is provided a self-propelled working unit comprising:

(a) a self-propelled vehicle comprising a high-clearance chassis, support means comprising longitudinally and horizontally extending flanges extending inwardly of said chassis, and means fixing said support means to said chassis;

(b) a work-facilitating device adapted to the transverse dimensions of said vehicle, said device including support means for cooperating with said support means of said vehicle to support said device on said vehicle and ground contact means for supporting said device on the ground; and (c) means for providing relative movement between said support means of said vehicle and said device to allow disengagement of said device from said vehicle by longitudinal movement of said vehicle relative to said device when said device is supported on the ground, said relative movement providing means comprising hydraulic circuit means including means for supporting said chassis on the ground and being independent of said device support means.

Relative movement between said vehicle support means and said device may be provided by a compensating system for the suspension of the high-clearance chassis on its steered wheel train, the compensating system being associated with said steered wheel train with means for vertical adjustment of the front part of said chassis of said vehicle.

Alternatively said vehicle may be provided with drive wheels, whose pneumatic tires are 100% inflated by liquid. Relative movement may then be provided by a hydraulic circuit which includes said drive wheel tires and means whereby the amount of liquid contained in said tires can be selectively varied so that the height of the front part of said vehicle can be correspondingly varied.

The device may comprise a rigid structure of plate shape which can be provided with various known devices required for the use of a tractor, e.g., a three-point hitch unit. The rigid structure may comprise a metal plate sufficiently thick to avoid the use of overloads, required for adhesion of the drive wheels in the case of tilling operations.

With such a device, a unit as described above can permit the use of tools which are generally intended for hitching to conventional tractors.

In addition, the additional means to be provided on the high-clearance vehicle of such a unit (supports and hydraulic circuits) are simple and do not give rise to any specific lay-out difficulty.

The invention will be more fully understood from the following description of several embodiments thereof, given by way of example only, with reference to the accompanying drawings.

In the drawings:

FIG. 5 is a partially broken away view similar to that of FIG. 1 showing a modification of the unit of FIG. 1;

FIG. 6 is a diagram of a hydraulic circuit for the unit of FIG. 1; and

FIGS. 6a to 6c are diagrams showing the operation of the circuit of FIG. 6.

Figure 1:
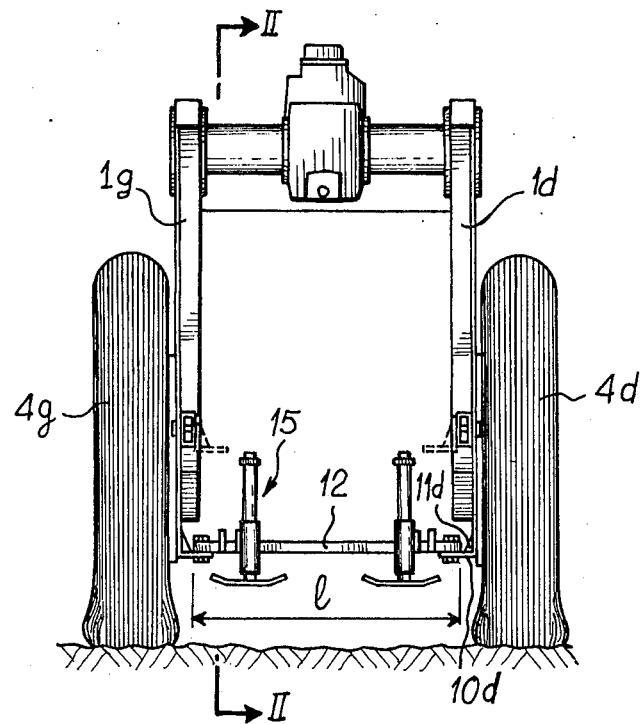
FIG. 1 is a cross-section in elevation from the rear showing an embodiment of a unit according to the invention.
Figure 2:
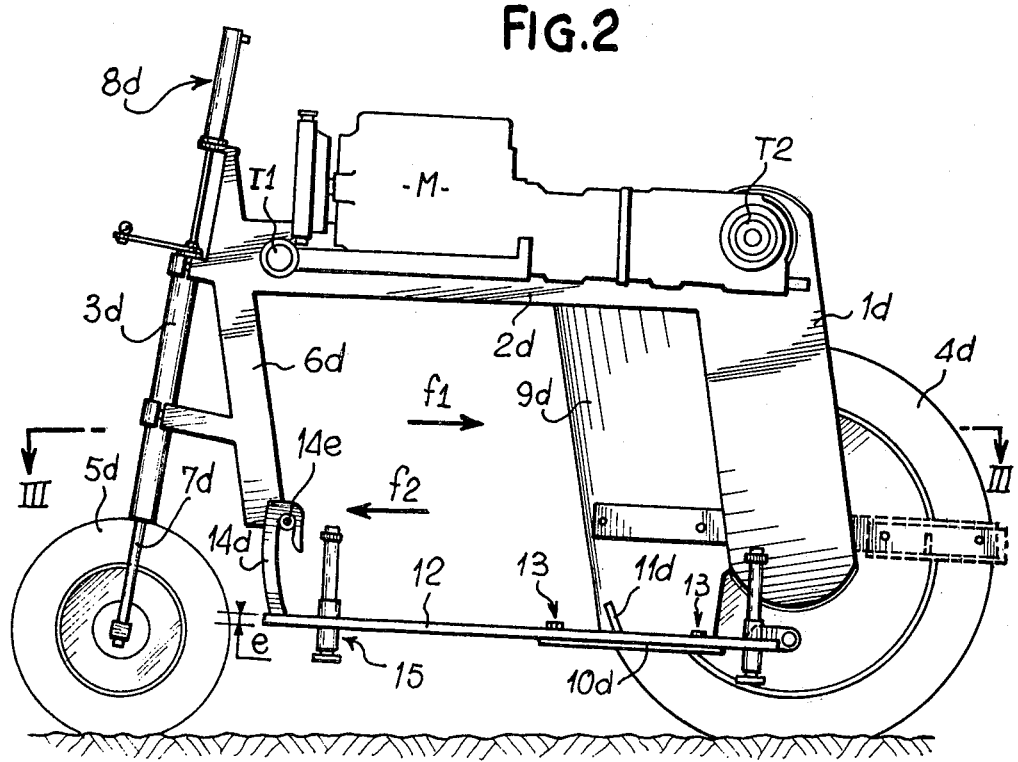
FIG. 2 is a longitudinal section on the line II—II of FIG. 1.
Figure 3:
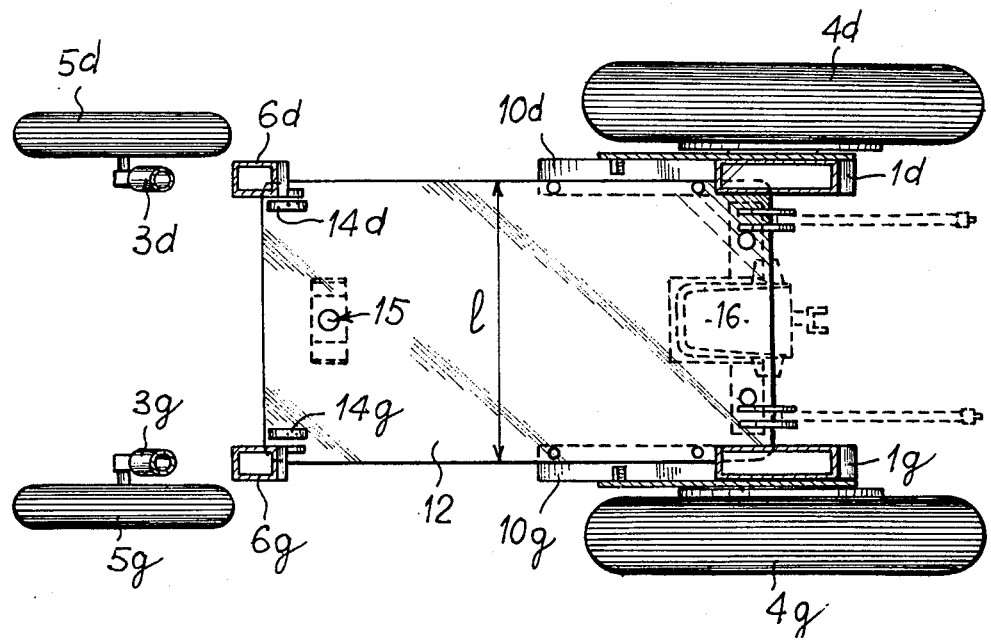
FIG. 3 is a horizontal section on the line III—III of FIG. 2.

FIGS. 1 to 3 show a high-clearance tractor of conventional structure. The tractor comprises a high clearance chassis comprising a first driving wheel strut $1d$ connected by a longitudinal member $2d$ to a first steered wheel strut $3d$ to form a right-hand flank, the top of which is connected by cross-members T1, T2 to the top part of a left-hand flank similar to the right-hand flank. The component parts of the left-hand flank bear references corresponding to the references of corresponding elements of the right-hand flank but with the substitution of the letter d for the letter g.

The chassis conventionally carries drive means M, transmission means leading to drive wheels 4, and steering means for steering the steered wheels 5; these means have not been shown. The resulting tractor is provided with a conventional hydraulic unit (not shown).

Each of the struts $3d$, $3g$ is reinforced by a profiled member $6d$, $6g$ which is inclined downwardly and rearwardly and which is connected by its top end to the longitudinal member $2d$, $2g$; its bottom end is free and is situated outside the range of pivoting of the wheel $5d$.

Each of the struts, e.g., strut $3d$, is conventionally provided with a pivot spindle $7d$ associated with the wheel $5d$ and adapted to slide in said strut $3d$. The top end of the spindle $7d$ is coupled to the piston rod of a double-action jack $8d$ disposed coaxially of the spindle $7d$. The cylinder of the jack $8d$ is fixed to the top end of the element $6d$.

The chambers of the jacks $8d$, $8g$ are connected to a circuit which will be described hereinafter, for providing inter alia a conventional hydraulic compensating system providing the suspension of the tractor chassis from the pivot spindles $7d$, $7g$ of the wheels 5.

A plate element $9d$ is also disposed vertically in the general direction of the right-hand flank, rearwardly of the element $6d$, and is rigidly fixed by two of its edges to the strut $1d$ and to the longitudinal member $2d$ in the form of a gusset.

The bottom edge of this plate 9d is practically horizontal for the normal position of use of the tractor and is connected to one of the edges of a rod or bar 10d which is disposed horizontally inwardly of the chassis. The bar 10d forms a longitudinal flange for the gusset 9d, similar to a bottom edge, and is horizontal and extends towards the interior of the chassis. A small rigid element 11d cut out from a plate in the form of a right-angled triangle is welded by its two edges adjacent the right-angle to the inner surface of the gusset 9d and to the top surface of the flange 10d; its third free edge is thus inclined towards the inside and towards the bottom of the chassis in the form of a splayed edge.

The left-hand flank is similarly provided with a gusset 9g having a flange 10g and a splayed edge 11g.

The work-facilitating device with which the tractor is associated includes a metal plate 12 having a substantially rectangular profile in plan view, a relatively considerable thickness "e" and a width "l" which is suitable for free engagement of the plate 12 longitudinally between the gussets 9d and 9g. The elements 11d, 11g form guide and centering means.

Plate 12 is partly borne by the flanges 10d, 10g and is fixed to the latter by bolts and nuts 13 passing through holes formed with suitable spacing in the plate and the flanges.

In this embodiment, the plate 12 extends practically flush with the reinforcing elements 6d, 6g and each of its front corners is connected to the foot of a bar or rod element 14d, 14g disposed in the form of an upright.

Figure 4:
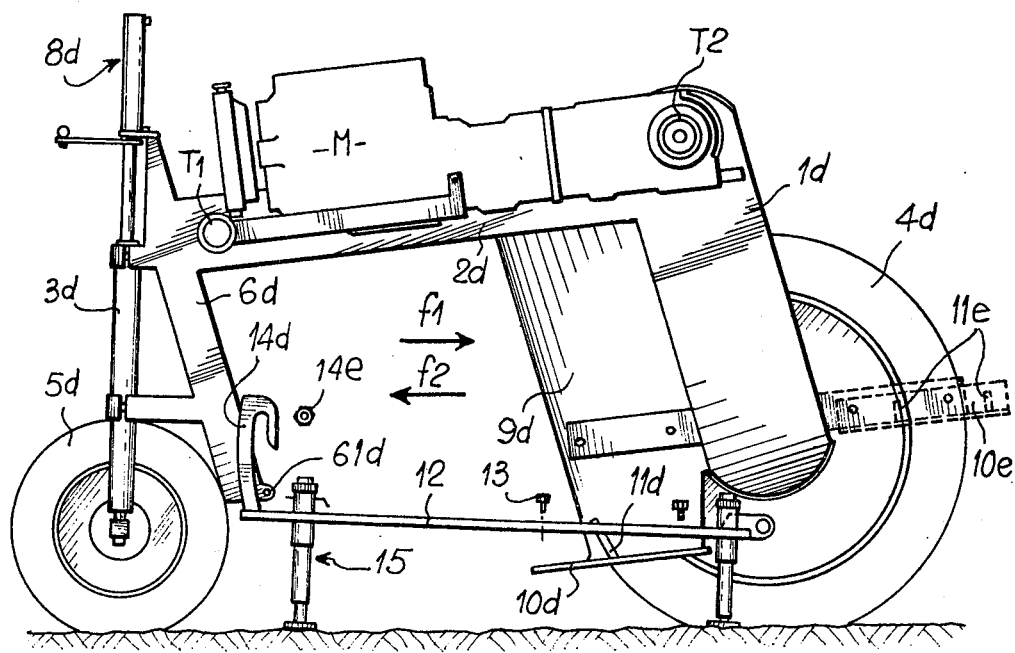
FIG. 4 is a view similar to that of FIG. 2 during assembly, or disassembly of the unit of FIG. 1.

Upright 14d is curved with a radius of curvature centered substantially on the geometric axis of the wheel 4d, while its free end is in the form of a suspension hook enabling it to be fixed to a lug 61d (FIG. 4) suitably welded for this purpose on element 6d. The fixing is provided by a screw-threaded spindle and nuts 14e.

Finally, plate 12 has three dogs 15 constructed in known manner in the form of vertically adjustable retractable ground supports, which will be described hereinafter.

The rear or front part of the plate 12 may be provided with a conventional three-point hitch system 16 such as is generally provided on conventional chassis tractors and which is connected to the hydraulic unit of the high-clearance tractor.

The above described composite self-propelled unit enables a device or tool (e.g., a plough) intended for conventional tractors to be used, and generally allows uses comparable to those of such conventional tractors.

Plate 12 may be made from a relatively dense and relatively uncomplicated metal (steel, cast iron) and its over-thickness "e" can be adapted to the value of the overloads advantageously added to the tractor drive wheels, irrespective of the chassis structure, to assure the ground-adhesion of these wheels, as is required for work such as tilling.

In every case, the plate 12 can be sufficiently rigid to provide the longitudinal and transverse bracing of the bottom parts of the high-clearance chassis and, in addition, it forms an excellent, impervious floor on which a seat and the controls, and even walls to form a driver's cab, can be arranged without any particular difficulty.

The self-propelled unit can also be rapidly dismantled for the tractor to be used to straddle planted crops or to construct other known self-propelled units, as proposed in the aforementioned U.S. Pat. No. 3,953,050.

In such cases, however, the complicated transportation of adhesion overloads is obviated.

To provide for dismantling, the two chambers of the jacks 8d, 8g are connected by pipes 17d, 18d, 17g, 18g (FIG. 6) to a spool valve system 19, for example, which is in turn connected by other pipes 20, 21 to a pump P and reservoir R of the hydraulic unit of the tractor. This system allows three distribution positions:

(a) Supply and bleed via the unit are closed, the top chamber of the jack 8d is connected to the bottom chamber of jack 8g and vice versa. These jacks then form a hydraulic compensating system.

(b) The top chambers of the two jacks 8d, 8g are connected to the pump P, their bottom chambers being connected to reservoir R. This position allows the front part of the chassis to be raised by tilting on the wheel axles 4.

(c) The top chambers of the two jacks are connected to the reservoir R to be bled while their bottom chambers are connected to the pump P to be supplied. This position causes the front part of the chassis to be lowered.

In this embodiment, the three dogs 15 are retractable by vertical sliding, are vertically adjustable by screwing, and their positions in relation to the chassis parts are such that they do not obstruct the operations described below.

The above-mentioned dismantling may be carried out as follows:

The front part of the chassis is raised (operation b mentioned above).

The dogs 15 are then lowered into a position in which they bear on the ground, so that the plate 12 is supported by them on the ground. If device 12 has no dogs, the self-propelled unit would be brought onto vertically adjustable ramps.

The nuts of the bolts 13 and connecting spindles 14e are unscrewed.

The valve system 19 is operated to lower the front part of the tractor (operation c mentioned above and FIG. 4); the plate 12 is thus disconnected from the flanges 10d, 10g of the high-clearance chassis by tilting the latter slightly about its drive wheel axles 4.

The tractor is reversed in the direction of arrow $f_1$ to leave the device 12 in the raised position on its dogs 15.

The valve system 19 is then operated (operation b followed by position a mentioned above) to raise and then suspend the chassis normally. The high-clearance tractor can then be used for work requiring crops to be straddled.

It will be appreciated that a large number of self-propelled units can be produced by associating the tractor with other suitable devices by the reverse sequence of operations to those described above; such devices will have on their side edges longitudinal supports adapted to cooperate with the tractor flange 10. In such cases, as the tractor is being engaged, during forward movement in the direction of arrow f with the device in a raised position at a height suitable for its connection to the tractor, the splayed edges of the elements 11d, 11g guide the device transversely and the spindles 14e form two stops for the uprights 14d, 14g, thus positioning the device longitudinally.

In case of devices shorter than plate 12 (which will not provide longitudinal bracing of the bottom parts of the chassis struts), these positioning stops can be provided on the tractor gussets 9d, 9g.

In the embodiment shown in FIG. 5, the high-clearance chassis suspension may be hydraulic or mechanical, but the pneumatic tires of the drive wheels 4 are 100% inflated by a non-freezing liquid, e.g., a solution of an ad hoc product in water.

The inflated tube 22 of each of these wheels 4 does not have the conventional retaining valve, but is connected by a pipe 22t to the rotary part of a device 23 for checking or inflating pneumatic tires during operation.

This known device 23 comprises a part 23f which is disposed coaxially of the axle 4a of the drive wheel 4 and is mounted on the outer end of this axle and is engaged in sealing-tight relationship in the axle.

The axle 4a has an axial duct 4c which provides communication between this connecting device 23 and an enclosure 24 by means of a pipe 24t fixed to chassis elements, more particularly the wheel strut 1d or 1g.

The pneumatic tire of the other drive wheel is connected to enclosure 24 in the same manner as described above.

The enclosure 24, which is fixed to the chassis, consists essentially of a tubular element or cylinder having one closed end and a piston 24p closing the other end and capable of sliding in the cylinder under the action of a jack 25 fixed conventionally between piston 24 and the tractor chassis.

The single-acting jack 25 may be connected by a valve pipe 25t to the pump and to the reservoir of the hydraulic unit of the tractor, and its section is very much smaller than the section of the piston of the enclosure 24. Finally, the maximum volume of this variable-capacity enclosure 24 is sufficient to contain at least the liquid equivalent to a substantial flatness of the tires of the wheel 4.

It will be seen that suitable operation of these valves will have the following effect:

Jack 25 can be partially bled to partially deflate the wheel tires 4 and hence lower the struts 1d, 1g in order to provide device or implement disconnection similar to that described above.

Jack 25 can be supplied until the drive wheels 4 have a suitable inflated volume for other uses or connections, as described above.

It will be seen that, because of the difference in section between the jack 25 and the enclosure 24, these operations can be carried out very quickly because the hydraulic unit can provide a supply liquid at a pressure of 100 kg/cm$^2$ while that of the liquid for the wheels must be 2 kg/cm$^2$ maximum.

Obviously these two hydraulic systems 19, 24 could be provided on a high-clearance tractor to give the above results by vertical movement of the tractor chassis.

These results could also be produced by providing a high-clearance chassis with lateral supports or flanges similar to the bent edges 10, but disposed rearwardly of the axles of the drive wheels 4. In the case of a connection made by tilting, the position of these supports is sufficiently far away from the tilting axis of the high-clearance chassis (the axes of the wheels 4 or wheels 5), and is also adapted to the configuration of the coupled implement.

Finally, plate 12 could have a conventional structure based on section members and plates to form a platform capable of being equipped with various implements generally intended for conventional tractor uses.

It will also be seen that the floor provided in some such cases, e.g., in the case of a grab or bucket, could be designed to cooperate with the flanges 10 and possibly the spindles 14e to form a transportation system.

There is thus provided a composite unit which can be quickly and easily produced by simple coupling and involving a self-propelled high-clearance chassis vehicle in practically insignificant additions and conversions, and which is suitable for use with tools, implements and machines generally intended for use with conventional tractors. Furthermore the unit includes a device of very simple structure whereby work similar to that of conventional tractors, more particularly tilling operations, can be carried out but without need to carry on the vehicle, when used for other purposes, the unnecessary and cumbersome adhesion weights required for tilling operations.

What is claimed is:

1. A self-propelling device comprising
   (a) a self-propelling vehicle having a high clearance chassis, drive wheels having pneumatic tires, steering wheels and lateral supports rigidly affixed to the lower portions of said chassis;
   (b) a work-facilitating element adapted to fit within the transverse clearance of said vehicle and provided with supports cooperating with said vehicle supports and with means for permitting its positioning in contact with the ground, said element comprising a plate-like structure of sufficient length and rigidity to assure the bracing of said lower portions of said chassis, whereby traction effort can be supported;
   (c) means on said device for relative vertical displacement between said vehicle supports and said element, whereby said vehicle supports may be uncoupled for disengagement of said element after it contacts the ground in order to permit longitudinal displacement of said vehicle, said means for relative vertical displacement comprising a system of circuits mounted on said vehicle, and including conventional means for adjustment, at least upon stoppage, of the pressure in the pneumatic tires at least of said drive wheels and of the elevation of suspension of said chassis on said steering wheels, whereby height displacements of said chassis are facilitated due to ground contact of the wheels of said vehicle.

2. A device according to claim 1, wherein said system of circuits includes said pneumatic tires of said drive wheels, a reservoir, and delivery and bleed means for selective control of the amount of fluid in said pneumatic tires.

3. A device according to claim 1 or 2, including means for suspending said chassis upon said steering wheels, said means comprising hydraulic jacks associated with said system of circuits, whereby the elevation of the suspended portion of said chassis from ground may be adjusted.

4. A device according to claim 1, wherein said vehicle supports are located on one side only of the vertical plane passing through the axle of said drive wheels.

5. A device according to claim 2, wherein said selective control means for each of said drive wheels comprises a connection including a conduit arranged in the axis of rotation of said drive wheels, said system of circuits comprising a jack, a cylinder having a piston controlled by said jack, forming an enclosure of adjustable volume connected to each of said connections by a tube attached to said chassis, thereby constituting an insulated circuit selectively controlling said amount of fluid.

6. A device according to claim 1, wherein said element comprises a rigid plate forming a floor and adapted to be connected to an implement or tool required for use with a tractor.

7. A device according to claim 6, wherein said plate is made of metal and is sufficiently thick to form the overload required for good adhesion of the drive wheels of said vehicle.

8. A device according to claim 1, wherein said supports of said element comprise retractable support means.

9. A device according to claim 6, wherein one of the ends of said plate comprises lateral hooks for suspension of said plate from the struts of the steering wheels of the vehicle chassis.

* * * * *

UNITED STATES PATENT AND TRADEMARK OFFICE
CERTIFICATE OF CORRECTION

PATENT NO. : 4,174,012
DATED : NOVEMBER 13, 1979
INVENTOR(S) : EMILE BOBARD

It is certified that error appears in the above—identified patent and that said Letters Patent is hereby corrected as shown below:

Please correct the "Assignee" entry for the above-noted patent to read:

-- Bobard Jeune, a part interest --.

Signed and Sealed this

Twelfth Day of August 1980

[SEAL]

Attest:

SIDNEY A. DIAMOND

Attesting Officer

Commissioner of Patents and Trademarks